July 7, 1964     I. Z. SMOKER     3,139,971
CONVEYOR

Filed Sept. 29, 1961     2 Sheets-Sheet 1

INVENTOR.
ISAAC Z. SMOKER
BY Walter V. Wright
AGENT

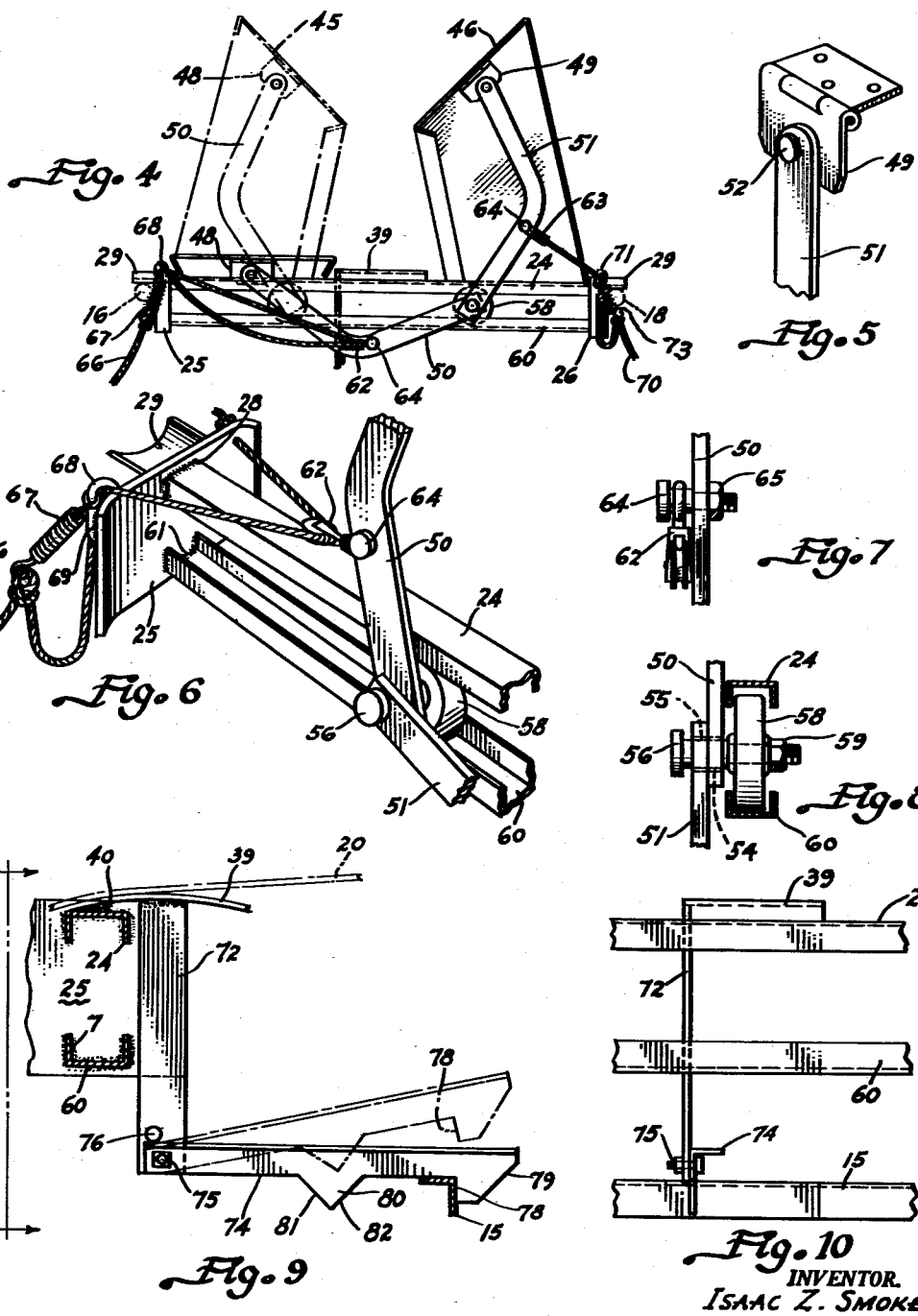

United States Patent Office 3,139,971
Patented July 7, 1964

3,139,971
CONVEYOR
Isaac Z. Smoker, Intercourse, Pa., assignor to Sperry Rand Corporation, New Holland, Pa., a corporation of Delaware
Filed Sept. 29, 1961, Ser. No. 141,722
8 Claims. (Cl. 198—185)

This invention relates to apparatus for conveying hay bales and the like. More specifically, it relates to mechanism for laterally discharging bales at predetermined points along a longitudinally extending conveyor.

Conveyor systems are commercially available for delivering hay bales and the like from the ground into the hay mow of a barn. These conveyor systems generally include an elevator section, an elongated horizontal section which extends the length of the barn near the peak of its roof, and a device for discharging bales laterally from the horizontal section at selectively variable points whereupon the bales drop into the mow. The horizontal conveyor sections are provided with side guides to prevent bales from falling off the conveyor before they reach the desired discharge point. The function of the discharge device is to make the bales fall laterally off the conveyor at the desired place in spite of the presence of the side guides on the horizontal conveyor section. The clearing of jammed bales, or the repair of mechanical failure in the horizontal conveyor section or at the discharge device is generally difficult and hazardous due to their positions high up in the barn and usually close under the roof. At present the elevator sections and horizontal sections of these conveyor systems have been developed to the extent that they are rugged, mechanically simple, substantially jam proof, and reasonably gentle to the bales conveyed. This is not always true however, of the mechanism for laterally discharging the bales from the conveyor. The function of discharging bales laterally from the horizontal section of the conveyor involves deflecting the bales at right angles to the direction in which they are conveyed while elevating the bales above the top of the side guides of the horizontal conveyor section. The weight of the bale, and the forces involved in elevating and deflecting the bales from the horizontal conveyor, renders the lateral discharge mechanism of the systems the most likely place for mechanical failure, jamming, or tearing apart of the hay bales to occur.

Some of the discharge devices currently known depend on each following bale to discharge the preceding bale. This is an undesirable feature, since sooner or later someone must climb up to the discharge device and manually remove the last bale.

It is an object of this invention to provide a device for discharging bales selectively to the right or left side of a horizontal bale conveyor.

It is another object of this invention to provide a rugged, maintenance free device for discharging bales laterally from a horizontal conveyor.

It is another object of this invention to provide a device for discharging bales laterally from a horizontal conveyor, which device is substantially jam proof and discharges each bale independently of any following bales.

It is another object of this invention to provide mechanism for laterally discharging bales from a horizontal conveyor wherein the bales are gently rolled from the conveyor while still in driven engagement with the horizontal conveyor.

It is another object of this invention to provide a device for laterally discharging bales from a horizontal conveyor wherein said discharge device is adjustable longitudinally of the horizontal conveyor to vary the point of bale discharge.

These and other objects and advantages of this invention will be more apparent with reference to the following specification taken in conjunction with the accompanying drawings wherein:

FIG. 4 is a rear elevational view of the mechanism of FIG. 2; but showing the deflector members set for discharge to the opposite side;

FIG. 5 is an enlarged fragmentary perspective view of a portion of a mechanism as seen in FIG. 4;

FIG. 6 is an enlarged fragmentary perspective view of a portion of the mechanism as seen in FIG. 4;

FIG. 7 is an enlarged fragmentary side elevational view of the pulley and mounting seen in FIG. 6;

FIG. 8 is an enlarged fragmentary side elevation of the track and roller seen in FIG. 6;

FIG. 9 is an enlarged side elevational view of the latch device incorporated in the bale discharge mechanism of this invention;

FIG. 10 is a rear end view of the latch device of FIG. 9.

Figure 1:
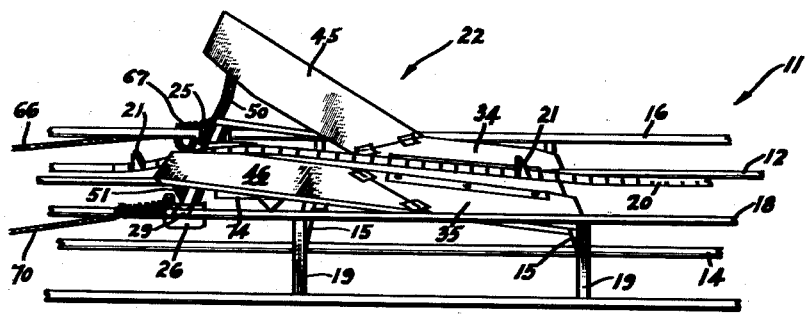
FIG. 1 is a perspective side view of a horizontal bale conveyor section having a discharge device constructed in accordance with the principles of this invention mounted thereon.
Figure 2:
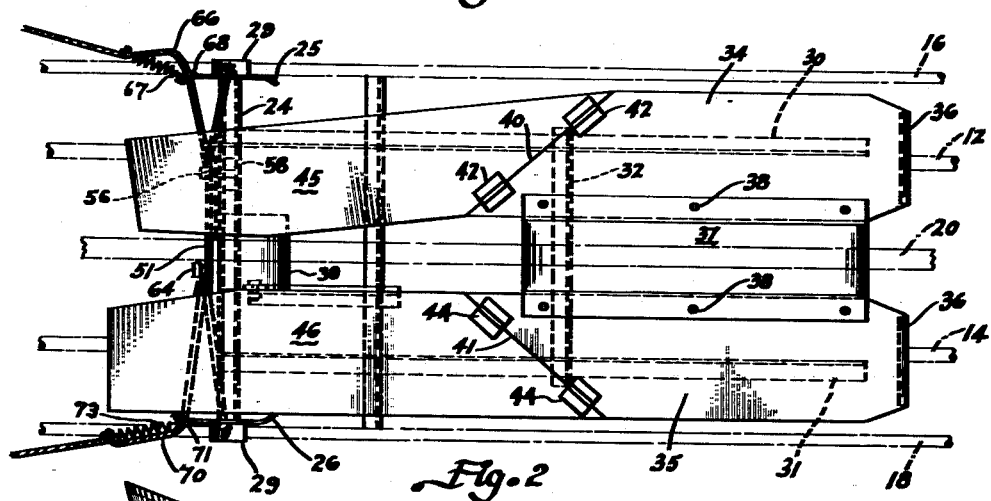
FIG. 2 is an enlarged plan view of the mechanism of FIG. 1.
Figure 3:
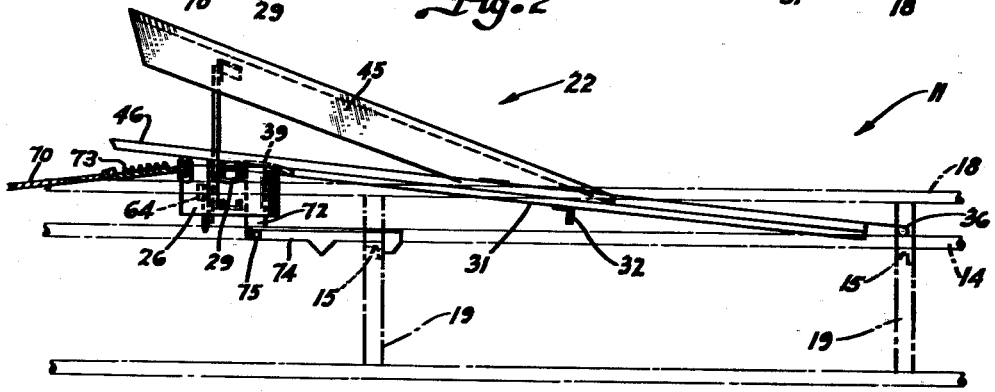
FIG. 3 is a side elevational view of the mechanism of FIG. 2.

Referring now to the drawings by numerals of reference, particularly FIGS. 1 through 3, the numeral 11 indicates, generally, a well known type of bale conveyor. The conveyor includes a bale supporting structure comprising longitudinally extending rails, or tubes, 12 and 14 joined at spaced intervals by transverse frame members 15. Right and left side guides, or rails, 16 and 18 are carried by vertical frame members 19 which are mounted at the ends of each transverse member 15. The side guides 16 and 18 are disposed above the horizontal plane of supporting rails 12 and 14 to prevent bales from falling off the support rails. An endless chain 20 is carried by the conveyor frame structure and driven from right to left, as seen in FIG. 1, in a well known manner not forming a part of this invention. Chain 20 carries lugs 21 at spaced intervals along its length. The lugs 21 engage bales deposited on supporting rails 12 and 14 and move the bales from right to left in FIG. 1 between side guides 16 and 18.

The reference numeral 22 indicates, generally, a device for elevating bales to the height of side guides 16 and 18 and discharging the bales laterally from the conveyor over the side guides. The bale discharging device has a generally rectangular frame comprising a rear transverse frame member 24 having right and left side plates 25 and 26, respectively, welded to its ends as shown at 28 in FIG. 6. Plates 25 and 26 each carry a runner member 29 which rests on one of the conveyor side guide rails 16 and 18. Extending downwardly and forwardly from rear frame member 24 are right and left longitudinal frame members 30 and 31, respectively (FIG. 2). A transverse frame member 32 extends between frame members 30 and 31 at approximately the longitudinal midpoint of members 30 and 31. The forward end of the discharge device frame includes longitudinally extending right and left ramp members 34 and 35. The forward ends of the ramp members are turned under to form beads 36 which rest on support rails 12 and 14 of the horizontal conveyor section. Thus it will be seen that the rear end of the discharge device frame is slidably supported on top of conveyor side guides 16 and 18 by runners 29 while the forward end is slidably supported at a lower level on the bale supporting members 12 and 14 of the conveyor. This renders the entire discharging device longitudinally movable along bale conveyor 11 in a manner which will be more fully described hereafter.

An elongate channel member 37 is disposed between ramp members 34 and 35 (FIG. 2) and mounted thereon by bolts 38. Member 37 serves to guide conveyor chain 20 upwardly substantially in the plane of the ramp members as the chain moves rearwardly therebetween. A generally horizontal, but slightly curved plate 39 is welded at 40 (FIG. 9) to the upper surface of rear transverse frame member 24 and serves to guide chain 20 back down over the rear end of the discharge device to its normal position between conveyor supporting rails 12 and 14.

As best seen in FIG. 2, the rear edges of ramp members 34 and 35 are angled acutely in the direction of bale travel as indicated, respectively, at 40 and 41. Right and left hinges 42 and 44, respectively, are mounted on the ramp members. The pivot axes of hinges 42 and 44 extend, respectively, along rear edges 40 and 41 of right and left ramp members 34 and 35.

A right deflector member 45 having a planar top surface and a forward edge which mates with rear edge 40 of right ramp member 34 is disposed rearwardly of the right ramp member and connected to hinges 42 for pivotal movement about edge 40. A left deflector member 46 is identically related to left ramp member 35 and left hinges 44. In FIG. 2, the left deflector member 46 is shown in its down position and right deflector member 45 is shown in its up position. When in down position, the deflector members form continuations of the ramp members 34 and 35. In FIGS. 2 and 4 it is most clearly seen that when either deflector member is pivoted upwardly about its hingedly mounted end, it planar top surface is canted relative to the frame due to the angles of pivot axes 40 and 41.

Toward the rear of deflector members 45 and 46, on the underside thereof, are mounted hinges 48 and 49, respectively. A right support arm 50 has one end pivotally connected to hinge 48. A left support arm 51 has one end pivotally connected to hinge 49. The connections are by shoulder bolts as may be seen at 52 in FIG. 5. The remaining ends of support arms 50 and 51 are provided respectively with holes 54 and 55 (see FIG. 8) through which extends a shoulder bolt 56. A roller 58 is rotatably carried by shoulder bolt 56 and retained thereon by a nut 59. Roller 58 rests in a channel track 60 which is disposed vertically below rear transverse frame member 24 and has its ends welded, as at 61 in FIG. 6, to frame side plates 25 and 26. It will be seen in FIG. 8 that the vertical spacing between track 60 and frame member 24 is such that roller 58 is retained on track 60 by the down down turned flanges of frame member 24 while being free to move laterally over the track 60.

The support arms 50 and 51 loosely carry conventional pulleys 62 and 63, respectively, approximately midway between their ends. As seen in FIG. 7, these pulleys are mounted on the arms by shoulder bolts 64 and nuts 65.

A pair of control ropes are provided for selectively raising and lowering the deflector members. A right control rope 66 (see FIG. 6) is anchored to right side plate 25, threaded through right support arm pulley 62 and a right guide loop 68, which is welded at 69 (FIG. 6) to right guide plate 25. A tension spring 67 has one end anchored in right guide loop 68 and the other end connected to rope 66, as best seen in FIG. 6. Spring 67 serves to hold a loop of slack rope adjacent guide loop 68. From tension spring 67 the rope extends to any convenient location from which it is desired to operate the discharge device. A similar left control rope 70 is identically connected to left side plate 26, entrained about a left support arm pulley 63, threaded through a left guide loop 71 and connected to a slack loop producing tension spring 73.

Depending from rear chain guide plate 39, just forwardly of rear transverse frame member 24, is a vertical arm 72 (see FIGS. 9 and 10). A longitudinally extending latch member 74, of L-shaped cross section, has its rear end pivotally attached to arm 72 by a nut and bolt 75. A second nut and bolt 76 serves as a stop to prevent latch 74 from pivoting downwardly about bolt-nut 75 beyond the generally horizontal position shown in solid lines in FIG. 9. At the forward end of latch 74 is a hook 78 having a cam face 79 on its forward end. Disposed approximately midway between hook 78 and pivot bolt 75 is a cam 80. Cam 80 has an inclined rear face 81 and an oppositely inclined forward face 82. As may be seen in FIGS. 3 and 9, latch 74 is so disposed that hook 78 will engage transverse conveyor frame members 15 to positively prevent the discharge device 22 from being pushed rearwardly along conveyor 11 when bales move rearwardly into engagement with the discharge device.

One of the features of this device is the ease with which it may be mounted on an existing conveyor. As seen in FIG. 3, with the exception of the raised position of deflector member 46, this device has a very small vertical dimension. To mount this device on an existing conveyor, the chain is lifted and device 22 is simply slid under the chain from one side. The normal slack in the chain provides sufficient clearance for the insertion of the discharge device without requiring that the chain be loosened.

Once the discharge device is resting on conveyor 11, its operation and longitudinal adjustment is completely controlled from the barn floor by ropes 66 and 70. As seen in FIG. 4, the device is set to discharge a bale to the left. If it were desired to discharge the next bale to the right in FIG. 4, rope 66 would be pulled. Due to the passage of rope 66 through pulley 62, this would pull right supporting arm 50, roller 58 and left supporting arm 51 to the left until arm 50 and right deflector member 45 reached the position shown in phantom. By this time, left deflector member 46 would have been pulled downwardly by support arm 51 to the position shown in FIG. 1. This movement is facilitated by the slack loop maintained in rope 70 by spring 73. In some installations where the ropes 66 and 70 extend great distances, and through many additional guides, not shown, there is produced a substantial rope drag which must be overcome by the operator in pulling the roller 58 left and right on track 60. The springs 67 and 73 relieve this drag at the bale discharging device by maintaining slack loops of rope from which the roller and support arms may draw in moving between their two positions. Actually the operator only pulls roller 58 half way across track 60 whereupon the roller and associated movable parts pass a "dead center" position and move the rest of the way under gravity.

Referring now to FIG. 1, a bale conveyed from right to left over supports 12 by 14 by chain 20 would be carried up on ramp members 34 and 35 and then onto deflector members 45 and 46. Due to the elevation and canting of right deflector 45, the side of the bale riding thereover would be elevated a greater amount than the side riding on left deflector 46. Before the bale can be pushed far enough up the deflector members for lugs 21 on chain 20 to pass underneath it, the bale will have rolled off the left side of conveyor 11 and over side guide 18. Thus, the lugs 21 on chain 20 drive the bales until they roll off the conveyor.

Sometimes a bale may be deposited on conveyor 11 directly on top of a set of lugs 21; in this case when the bale rides up deflectors 45 and 46, it may be lifted off the lugs before the bale has been advanced far enough to roll off the conveyor. The next set of lugs, however, will engage the end of the bale and continue its movement up the deflector members until it rolls off the conveyor. Due to the rolling of the bales off the conveyor the bales are lifted off lugs 21. This prevents the lugs from tearing the bale or the baling twine as sometimes occurs in devices which slide the bales off the conveyor.

The discharge device 22 is moved longitudinally along the conveyor 11 to vary the point of discharge in the following manner. Either rope 66 or 70 is pulled until its deflector member is in raised position. Further tension on the same rope in the direction of extent of the conveyor will then move the device 22 along the conveyor. With reference to FIGS. 3 and 9, the discharge device is normally prevented from moving to the left by the engagement of hook 78 with the transverse conveyor frame members 15. To move the device to the left, it must first be moved to the right until cam surfaces 81 and 82 have moved over member 15. A quick pull to the left will then cause cam surface 81 to strike member 15. This causes latch 74 to bounce up to the position shown in phantom in FIG. 9 and the latch 74 is carried to the left past member 15 before hook 78 returns to its horizontal engaging position. As long as the device is moved quickly over a member 15 from right to left, hook 78 will miss it. If the device is moved slowly over a member 15 from right to left, surfaces 81 and 82 ride over the member 15 and hook 78 engages it. If the device 22 is moved from left to right in FIGS. 3 and 9, the cam surface 79 rides over the frame member 15 until hook 78 drops into engagement therewith. Stop 76 prevents the latch 74 from dropping below operative position while it is moving between consecutive members 15.

The broad planar surfaces of deflector members 45 and 46 and ramp members 34 and 35, along with the canting of the raised deflector member, provides positive control of the bale which enables it to be driven by chain lugs 21 until the center portion of the bale raises vertically from the chain in the act of rolling off the discharge device. This arrangement prevents the jamming which occurs in some devices wherein the drive chain is disengaged from the bale too soon, and it prevents the jamming and bale tearing which occurs in other devices wherein the bale is guided laterally while the conveyor chain lugs may still be in engagement therewith.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. A bale conveyor comprising support structure, means carried by said support structure for moving bales thereover in a predetermined direction, side guides on said support structure between which said bales travel, and means for elevating bales above said side guides and discharging the bales laterally from said conveyor, said elevating and discharging means comprising a frame disposed on said support structure, right and left bale deflecting members carried by said frame and each having one end connected to the frame for vertical pivotal movement about an axis extending at an acute angle to said predetermined direction of movement of bales over said support structure, said deflecting members being inclined upwardly from said one end, a track on said frame extending transversely to the direction of bale travel, a member seated on said track and movable therealong, support means interconnecting said movable member and said right and left bale deflecting members, and means for selectively moving said movable member along said track toward one of said bale deflecting members whereby said one of said bale deflecting members is pushed upwardly about its pivoted end by said support means and the other of said bale deflecting members is pulled downwardly about its pivoted end by said support means.

2. A bale conveyor comprising an elongated support structure, means carried by said support structure for moving bales longitudinally thereover, right and left side guides on said support structure between which said bales travel, and means for elevating bales above said side guides and discharging the bales laterally from the conveyor, said elevating and discharging means comprising a frame carried by said support structure, right and left bale deflecting members carried by said frame, each of said bale deflecting members having a front end and a rear end, right and left pivot means respectively connecting the front end of said right and left bale deflecting members to said frame for vertical pivotal movement relative thereto about axes extending at acute angles to the direction of movement of bales over said support structure, said deflecting members being inclined upwardly in the direction of bale travel from said pivot means, a track on said frame adjacent the rear end of said bale deflecting members and extending transversely to the direction of bale travel, a roller on said track, a pair of support arms, one of said arms extending from said roller to said right bale deflecting member and the other support arm extending from said roller to said left bale deflecting member, and means for selectively moving said roller right or left over said track toward one of said bale deflecting members whereby said one of the bale deflecting members is pushed upwardly about its pivotal connecting means by the support arm extending between said one deflecting member and said roller.

3. A bale conveyor as recited in claim 2 wherein said means for moving bales over said support structure comprises an endless chain, said right and left bale deflecting members extending in the direction of bale travel and being laterally spaced apart a distance not less than the width of said chain, and means on said frame for guiding said chain over said frame and between said bale deflecting members.

4. A bale conveyor as recited in claim 2 wherein said bale deflecting members each have a planar top surface onto which said bales are moved by said moving means, said right and left pivot means respectively defining pivot axes which extend at acute angles to the direction of bale travel and converge in the direction of bale travel whereby as said bale deflecting members are pivoted upwardly about said pivot axes the planar top surfaces thereof are canted relative to said frame to laterally deflect bales moving thereover.

5. A bale conveyor as recited in claim 2 wherein said frame rests on said support structure and is slidable thereover to vary the point of discharge of said bales from said support structure, and means carried by said frame and selectively engageable with said support structure to prevent relative movement between said frame and said support structure.

6. A bale conveyor as recited in claim 5 wherein said means for selectively moving said roller right or left over said track comprises a pair of flexible lines, said lines being connected respectively to said support arms whereby the application of tension to one of said lines moves said roller over said track to raise one of said deflecting members and lower the other deflecting member, whereupon further tension applied to said line moves said frame longitudinally along said support structure.

7. A bale conveyor comprising an elongated support structure, means carried by said support structure for moving bales longitudinally thereover, and means for discharging the bales laterally from the support structure, said discharging means comprising a frame carried by said support structure, a bale deflector member carried by said frame, said deflector member having a forward end, a rear end and an elongate planar bale engaging surface extending longitudinally along said support structure between said ends, means connecting the forward end of said deflector member to said frame for vertical pivotal movement about an axis extending at an acute angle to the longitudinal extent of said support structure, and means for raising said rear end of said deflector member about said pivotal connecting means whereupon said planar bale engaging surface is canted laterally relative to said support structure to deflect bales laterally therefrom.

8. A bale conveyor comprising an elongated generally horizontally extending support structure, an endless chain carried by said support structure for moving bales longitudinally thereover, right and left side guides on said support structure between which bales are moved, and means for elevating bales above said side guides and discharging the bales laterally from the conveyor, said elevating and discharging means comprising a frame carried by said supporting structure and slidable therealong to vary the point of discharge of said bales, said frame including a ramp having a front end disposed substantially in the plane of said support structure and a rear end disposed substantially at the height of said side guides, a chain guide on said ramp over which said endless chain rides whereby bales moved along said support structure by said chain move up said ramp, right and left longitudinally extending bale deflecting members disposed rearwardly of said ramp and on opposite sides of said chain, each of said bale deflecting members having a front end, a rear end and a planar top surface, right and left pivot means respectively connecting the front ends of said bale deflecting members to the rear end of said ramp for vertical pivotal movement about axes extending at acute angles to the direction of bale travel whereby when said bale deflecting members are pivoted upwardly about said pivot means said planar top surfaces are canted relative to said frame, a track on said frame adjacent the rear ends of said bale deflecting members and extending transversely relative to the direction of bale travel, a roller resting on said track and being movable thereover, right and left support arms each having one end connected to said roller, the other end of said right support arm being connected to the rear end of said right bale deflecting member, the other end of said left support arm being connected to the rear end of said left bale deflecting member, and means for selectively moving said roller right or left over said track toward one of said bale deflecting members whereby that one of said bale deflecting members will be pushed upwardly about its pivot means by the support arm extending between said one deflecting member and said roller.

References Cited in the file of this patent
UNITED STATES PATENTS

| | | |
|---|---|---|
| 2,639,024 | Kneer | May 19, 1953 |
| 2,990,053 | Lance et al. | June 27, 1961 |
| 3,001,635 | Beiler | Sept. 26, 1961 |